(12) United States Patent
Cecconi

(10) Patent No.: US 8,179,083 B2
(45) Date of Patent: May 15, 2012

(54) STARTING DEVICE FOR ELECTRIC MOTORS

(75) Inventor: Pietro Cecconi, Milan (IT)

(73) Assignee: Electrica S.r.l., Milan (IT)

( * ) Notice: Subject to any disclaimer, the term of this patent is extended or adjusted under 35 U.S.C. 154(b) by 298 days.

(21) Appl. No.: 12/551,836

(22) Filed: Sep. 1, 2009

(65) Prior Publication Data

US 2010/0052600 A1   Mar. 4, 2010

(30) Foreign Application Priority Data

Sep. 2, 2008   (IT) ................. PC20080011 U

(51) Int. Cl.
*H02P 1/44*   (2006.01)
(52) U.S. Cl. ......... 318/778; 318/781; 318/789; 318/790
(58) Field of Classification Search ............. 318/727, 318/778, 781, 784, 789, 790, 792, 794, 795
See application file for complete search history.

(56) References Cited

U.S. PATENT DOCUMENTS

| | | | | |
|---|---|---|---|---|
| 3,962,964 A * | 6/1976 | Engebretsen | ............ | 100/51 |
| 3,970,908 A * | 7/1976 | Hansen et al. | ............ | 318/786 |
| 3,976,924 A * | 8/1976 | Vanjani | ............ | 318/790 |
| 4,241,302 A * | 12/1980 | Benjamin | ............ | 318/758 |
| 4,719,399 A * | 1/1988 | Wrege | ............ | 318/786 |
| 5,212,436 A * | 5/1993 | Nacewicz et al. | ............ | 318/788 |
| 5,657,194 A * | 8/1997 | Waltz | ............ | 361/75 |
| 7,071,650 B2 * | 7/2006 | Ilda | ............ | 318/785 |
| 7,515,029 B2 * | 4/2009 | Sahashi et al. | ............ | 337/89 |
| 7,777,438 B2 * | 8/2010 | Schmidt et al. | ............ | 318/430 |
| 2006/0055364 A1 * | 3/2006 | Park et al. | ............ | 318/788 |

* cited by examiner

*Primary Examiner* — Bentsu Ro
(74) *Attorney, Agent, or Firm* — Young & Thompson

(57) ABSTRACT

Starting device for electric motors provides a circuit including: a first branch connected at one end to a common point and at the opposite end to the start winding of the motor, whereon a starting capacitor, a resistor and fixed contacts of a relay are inserted in series respectively; a second branch in parallel with the first branch, connected at one end to the common point and at the opposite end to the main or run winding of the motors whereon the coil of the relay is inserted; a third branch in parallel with the branches and, connected at one end to the common point and at the opposite end to the start winding of the motor, whereon a run capacitor is installed, this common point being connected to the common connector of the motor via the power supply line.

3 Claims, 1 Drawing Sheet

STARTING DEVICE FOR ELECTRIC MOTORS

The present invention provides a starting device for electric motors, more particularly intended for use with motors of compressors or the like, made up of a circuit comprising a current relay in series with a resistor of preset value or with an NTC resistor, and two capacitors connected respectively in series and in parallel to the relay.

The starting device according to the invention is inserted between the line and the start winding of the motor and allows advantages to be obtained in terms of efficiency due to the use of two capacitors, a starting one and a permanent one, without however the disadvantages which said components would entail if used without the resistor in series with the relay.

As is known, in refrigerators the unit made up of motor and compressor is generally formed by a single hermetically sealed block, placed in a casing whereto appropriate connections are attached for connection to starting and protection devices.

These connectors are standardised and generally comprise three male contacts whereon the starting and protection devices are inserted, comprising means able to supply for a short length of time a start current, necessary for starting the motor, and thermally actuated protection devices.

For a long time a relay was used as starting device, which was closed for the time necessary for supplying the motor windings with the start current and which then opened when the motor reached the number of revs foreseen.

In more recent times, in many cases, the relays have been replaced by a positive temperature coefficient (PTC) resistor which, compared to the relay, has various advantages.

The PTC in fact is made up of a resistor which is combined with that of the windings, so that the latter can be made with a smaller number of turns, with consequent saving in material and a slight decrease in overall dimensions.

Since however the PTC is always connected, it continues to absorb current, even if to a minimal extent (a few watts per hour).

To avoid these disadvantages a starting device has been provided, described in the Italian utility model no. 252.095 by the same Applicant, which provides for the placing in series of the relay and PTC resistor, in such a way that, once the motor has been started, the relay is opened and the PTC resistor disconnected.

The object of the present invention is that of providing a starting device for electric motors characterised by even better efficiency compared to those made according to the prior art.

This object can be achieved by coupling a current relay to two capacitors, a starting one in series with said relay, and a permanent one connected in parallel, which, by varying the phase displacement between current and voltage, improve the efficiency of the device to the benefit of lower energy consumption.

The problem of a circuit configured in this way is that during the starting phase, at the moment when the relay is closed, the run capacitor, which in the meantime has charged, suddenly discharges, creating very high instantaneous current peaks capable of burning the contacts after a few start-ups.

To avoid the problem the invention provides for the inserting of a resistor of fixed ohm value in series with the relay, placed between the starting capacitor and said relay and able to absorb the current peak generated by the discharge of the capacitor when the contacts are closed.

The value of this resistor is calibrated in such a way as to limit as far as possible the current peak which traverses the contacts at the time of their closure, yet at the same time to allow the passage of a current sufficient for starting the electric motor.

The circuit configured in this way moreover itself becomes a safety circuit which functions in parallel with the thermal protector, which is in any case always used. The resistor can in fact be calibrated so as to disintegrate if supplied for an excessive length of time, for example in the case of problems of starting of the motor or, if overcharged, by opening the circuit and interrupting supply to the relay.

The advantage of the present invention is clear in that it allows a starting device to be obtained which is characterised by improved electrical efficiency and by a cost which is definitely lower than devices equipped with PTC resistors.

According to an embodiment of the invention, provision is made to use an NTC resistor in place of the resistor of fixed ohm value, in order to block the current peak generated by the capacitors during starting.

The NTC resistor is in fact characterised in that it varies its resistance as the temperature changes and, more particularly, reduces the resistance as the temperature increases. As a result, at ambient temperature, the NTC is inhibited and prevents the passage of current towards the relay, whereas, as it heats up, the resistance decreases and allows the passage of current.

In this way, at the moment when the contacts are closed, the current peak, with duration of a few milliseconds, is absorbed by the NTC resistor which heats and then allows the passage of stabilised current via the relay contacts towards the motor.

In this case the device is more expensive due to the use of the NTC resistor compared to a common resistor, with the advantage however of obtaining complete absorption of the current peak by said resistor before starting of the motor.

The present invention will now be described in detail, by way of a non-limiting example, with reference to the accompanying drawings, in which.

Figure 1:
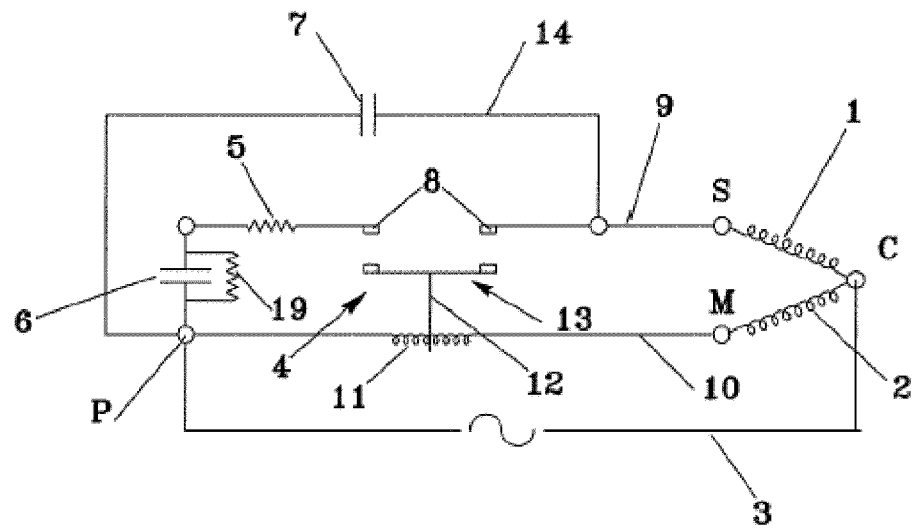
FIG. 1 is a plan view of the wiring diagram of the starting device for electric motors, according to the invention.
Figure 2:
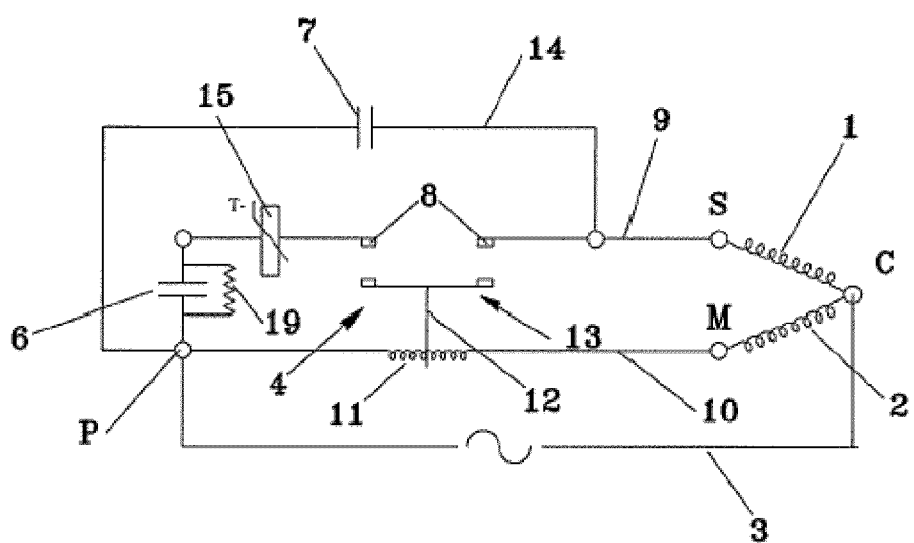
FIG. 2 is a plan view of the wiring diagram of the starting device for electric motors, wherein the resistor of fixed value is replaced by an NTC resistor.

Referring to FIG. 1, 1 and 2 denote respectively the starting and run windings of an electric motor, connected on one side to a common power supply line 3 and on the opposite side to the starting device according to the invention.

Said device comprises a normally open relay, denoted overall by 4, a resistor 5, preferably of fixed ohm value, a starting capacitor 6 and a run capacitor 7.

The capacitor 6 and the resistor 5 are both connected in series to the contacts 8 of the relay and positioned on the branch 9 connected to the start winding 1 of the electric motor. A resistor 19 is connected in parallel to the capacitor 6.

Positioned on a second branch 10 in parallel with the branch 9 is the coil 11 which actuates the mobile part 12 of the relay 4, whereon the contacts denoted by 13 are attached, said branch 9 being connected at the opposite end to the main winding 2 of the electric motor.

The permanent capacitor 7 is instead positioned on a third branch 14 in parallel with the branches 9 and 10, also connected to the start winding 1 of the motor.

The functioning of the device takes place as described herein below:

during the phase of starting, when supply is activated on the line 3, the capacitor 7 is charged instantaneously, while the contacts 8 and 13 of the relay are still open. After a few moments the coil 11 of the relay 4 closes the contacts 8 and 13 which, by in turn closing the circuit, cause the discharge of the capacitor 7 towards the resistor 5.

The current peak generated traverses therefore the resistor 5, fading before arriving at the contacts 8 and 13 which in this way remain protected.

As mentioned previously, the value of this resistor is a compromise which allows the current peak which traverses the contacts at the time of their closure to be limited as far as possible, yet at the same time allows the passage of sufficient current for starting the electric motor.

Said resistor 5 can however also be calibrated so as to disintegrate if supplied with power for an excessive length of time, for example in the case of problems of starting of the motor or if the contacts 8 and 13 of the relay remain stuck, or if it is overcharged excessively. In this way opening the circuit and interrupting the supply to the relay provides additional safety, in addition to that provided by the thermal protector.

The resistor 19 serves to dissipate in a short time the charges which have accumulated in the capacitor 6 or in any case to have it discharged after its use, in such a way that if a restart is carried out within a few seconds from the first, the capacitor 6 would already be discharged.

The invention, according to a second embodiment illustrated in FIG. 2, provides for the use of an NTC resistor 15 in place of the resistor 5. The functioning is very similar to that described previously.

When the power supply is activated the NTC resistor 15, being still at ambient temperature, is inhibited and prevents the current peak generated by the capacitors from traversing the contacts 8 and 13, damaging them. When the NTC is heated due to the absorbed current peak, it allows the passage of the stabilised current via said contacts 8 and 13 and therefore the starting of the electric motor.

An expert in the field may then provide changes or variations which are all to be considered as coming within the sphere of the present invention.

The invention claimed is:

1. Starting device for electric motors, more particularly for use with motors of compressors, comprising:
   a relay (4) in series with a resistive element (15);
   a starting capacitor (6) and a run capacitor (7) respectively connected in series and in parallel to said relay (4); and
   a circuit comprising:
   a first branch (9) connected at one end to a common point (P) and at the opposite end to the start winding (1) of the motor, with said starting capacitor (6), said resistive element (15) and the fixed contacts (8) of said relay (4) being inserted in series in said first branch (9);
   a second branch (10), in parallel with the first branch (9), connected at one end to the common point (P) and at the opposite end to the main or run winding (2) of the motor, with the coil (11) of the relay (4) being inserted in said second branch (10); and
   a third branch (14), in parallel with said first (9) and said second (10) branch, connected at one end to the common point (P) and at the opposite end to the start winding of the motor, with said run capacitor (7) being installed in said third branch (14);
   wherein the common point (P) is connected to the common connector (C) of the motor via the power supply line (3); and
   wherein said resistive element (15) is an NTC resistor,
   whereby, when the power supply to the electric motor is activated, said NTC resistor (15), being still at ambient temperature, is inhibited and prevents the current peak generated by the capacitors from traversing the contacts (8, 13) of the relay (9), and then the same NTC resistor, when heated due to the adsorbed current peak, allows the passage of the stabilised current via said contacts (8, 13) and therefore the starting of the electric motor.

2. Starting device for electric motors, according to claim 1, wherein said relay (4) and said resistive element constituted by an NTC resistor (15) are inserted between the start winding (1) of the motor and the power supply line (3).

3. Starting device for electric motors, according to claim 1, wherein a resistor (19) is provided in parallel with the starting capacitor (6).

* * * * *